United States Patent [19]

Lama et al.

[11] 4,226,527

[45] Oct. 7, 1980

[54] ANTI-STROBING FILTERS

[75] Inventors: William L. Lama, Webster; Ned J. Seachman, Penfield, both of N.Y.

[73] Assignee: Xerox Corporation, Stamford, Conn.

[21] Appl. No.: 63,227

[22] Filed: Aug. 3, 1979

[51] Int. Cl.[3] .................... G03G 15/22; G03B 27/76

[52] U.S. Cl. .................... 355/71; 355/11

[58] Field of Search .................... 355/3 R, 67–71, 355/77, 30

[56] References Cited

U.S. PATENT DOCUMENTS

| | | | |
|---|---|---|---|
| 2,959,105 | 11/1960 | Sayanagi | 355/71 X |
| 3,466,127 | 9/1969 | Haver | 355/40 |
| 3,488,118 | 1/1970 | Parrent et al. | 355/71 |
| 3,967,894 | 7/1976 | Tsilibes | 355/67 |
| 4,132,477 | 1/1979 | Watabe et al. | 355/71 X |

*Primary Examiner*—Donald A. Griffin
*Attorney, Agent, or Firm*—Ronald F. Chapuran

[57] ABSTRACT

Several types of transmission filters are disclosed having specified transmittance functions to eliminate strobing in scanning an image through an aperture onto a photoreceptor. A general requirement or condition on photoreceptor irradiance profiles has been found to minimize strobing. photoreceptor irradiance profiles are generally the product of the time irradiance function of the periodically energized illuminating lamp and the spatial irradiance profile across the aperture near the photoreceptor. It has been found that strobing is eliminated if the Fourier transform of the spatial irradiance profile is zero, evaluated at the fundamental frequency of the illuminating lamp and at those multiples of the fundamental frequency at which the lamp has power. A transmission filter with predetermined transmittance characteristics therefore, can be disposed in the image path near the aperture to provide a spatial irradiance profile having a zero Fourier transform at the required spatial frequencies.

12 Claims, 17 Drawing Figures

RECTANGULAR SPATIAL IRRADIANCE PROFILE

EXPOSURE DISTRIBUTION

FOURIER TRANSFORM OF H1(X) SHOWN IN FIGURE 9a

| $H_1(X)$ | | M/m |
|---|---|---|
| 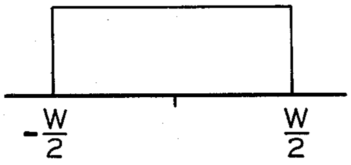 | $\mathrm{rect}\left(\frac{x}{w}\right)$ | $\mathrm{sinc}\left(\frac{wfo}{v}\right)$ |

FIG. 10a

| $H_1(X)$ | | M/m |
|---|---|---|
| 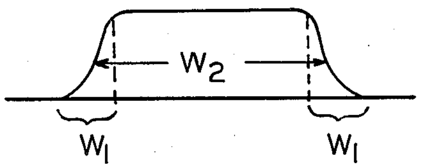 | $\mathrm{tent}\left(\frac{2x}{w_1}\right) * \mathrm{rect}\left(\frac{x}{w_2}\right)$ (*designates convolution) | $\mathrm{sinc}^2\left(\frac{w_1 fo}{2v}\right)$ $\mathrm{sinc}\left(\frac{w_2 fo}{v}\right)$ |

FIG. 10b

| $H_1(X)$ | | M/m |
|---|---|---|
| 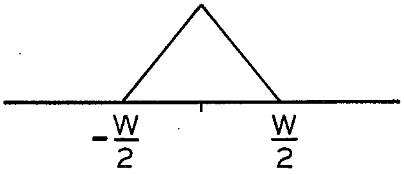 | $\mathrm{tent}\left(\frac{2x}{w}\right)$ | $\mathrm{sinc}^2\left(\frac{wfo}{2v}\right)$ |

FIG. 10c

| $H_1(X)$ | | M/m |
|---|---|---|
| 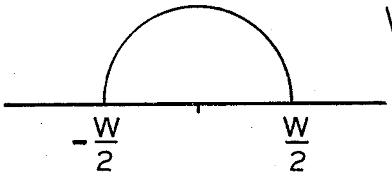 | $\sqrt{1-(2x/w)^2}\ \mathrm{rect}\left(\frac{x}{w}\right)$ | $\dfrac{J_1\left(\frac{\pi w}{v} fo\right)}{\left(\frac{\pi w}{v} fo\right)}$ |

FIG. 10d

| $H_1(X)$ | | M/m |
|---|---|---|
| 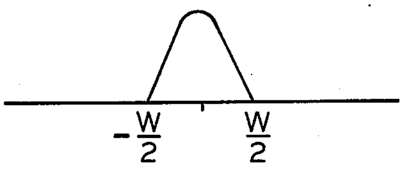 | $\cos\left(\frac{\pi x}{w}\right) \mathrm{rect}\left(\frac{x}{w}\right)$ | $\frac{1}{2}\mathrm{sinc}\left(\frac{wfo}{v}-\frac{1}{2}\right)$ $+\frac{1}{2}\mathrm{sinc}\left(\frac{wfo}{v}+\frac{1}{2}\right)$ |

FIG. 10e

ANTI-STROBING FILTERS

This invention relates to an electrophotographic printing machine and similar exposure systems that may be described as "slit exposed image scanning systems", and in particular to scanning an image through an aperture onto a moving photosensitive surface.

An undesirable phenomenon known as strobing often occurs in scanning an image through an aperture defined by an aperture plate onto a photosensitive surface. For example, although the light from a florescent lamp running on line current appears to the eye to be continuous, it is actually flashing at the rate of 120 Hz. The result can be a periodic variation in exposure (time integrated irradiance) on the photosensitive surface in the direction of motion of the photosensitive surface across the aperture.

There are methods for compensating for this strobing effect. One method is to increase the frequency of the illumination lamp such as taught in U.S. Pat. No. 3,998,539 assigned to the same assignee as the present invention. This method, however, requires a high frequency power supply and adds components and complexity to the illumination system. It would be desirable, therefore, to provide a means to eliminate strobing effects without the necessity of a high frequency power supply or other components.

Another method of eliminating strobing is to de-focus the aperture plate by increasing its distance above the photosensitive surface. However, this is not always a desirable solution since too much de-focus widens the exposure region, leading to increased image tracking errors on a cylindrical photoreceptor. It also may be necessary to move the aperture plate to a different position for each magnification in a multiple magnification system. In addition, if the illumination profile on the photosensitive surface is not symmetrical, de-focus of the aperture plate may not completely solve the strobing problem. It would be desirable, therefore, to provide a means to minimize strobing that is readily adaptable to a multiple magnification system and could compensate for non-symmetrical illumination and be useful with non-rectangular apertures.

The problem is sometimes overcome by the use of long persistance fluorescent lamp phosphors which reduce the fractional variation of lamp radiance. However, in systems using xenon or gas discharge light sources, there is frequently little or no retention time. Tungsten lamps operating on AC current also exhibit strobing. Another method of overcoming strobing is to provide an aperture width wide enough to smooth the difference in illumination between points on the photoreceptor. This, however, can also lead to image tracking errors on cylindrical photoreceptors. It would be desirable, therefore, to provide a simple means to overcome strobing that does not decrease image resolution.

Accordingly, it is a primary object of the present invention to eliminate strobing in scanning an image through an aperture onto a photosensitive surface. Further advantages of the present invention will become apparent as the following description proceeds, and the features characterizing the invention will be pointed out with particularity in the claims annexed to and forming a part of this specification.

Briefly, the present invention is concerned with providing several types of optical transmission filters having specified transmittance functions to eliminate strobing in scanning an image through an aperture onto a photoreceptor. A general requirement or condition on photoreceptor irradiance profiles has been found to minimize strobing. Photoreceptor irradiance functions are generally the product of the time dependence of the periodically energized illuminating lamp and the spatial dependence of the irradiance profile across the aperture near the photoreceptor. It has been found that strobing is eliminated if the Fourier transform of the spatial irradiance profile is zero, evaluated at the fundamental frequency of the illuminating lamp and at those multiples of the fundamental frequency at which the lamp has power. A transmission filter with predetermined transmittance characteristics therefore, can be disposed in the image path near the aperture to provide a spatial irradiance profile having a zero Fourier transform at the required spatial frequencies. In other words, a transmission filter having specified transmission characteristics interposed in the image path eliminates strobing.

For a better understanding of the present invention, reference may be had to the accompanying drawings wherein the same reference numerals have been applied to like parts and wherein.

Figure 5:
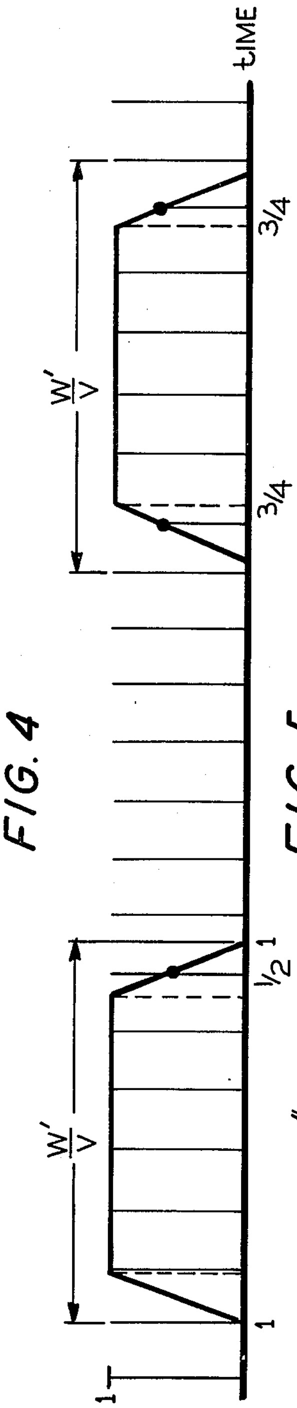
FIG. 5 illustrates the elimination of the strobing shown in FIG. 4.
Figure 6:
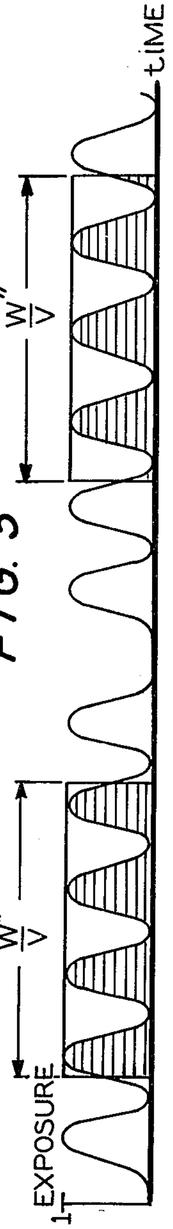
Figure 7:
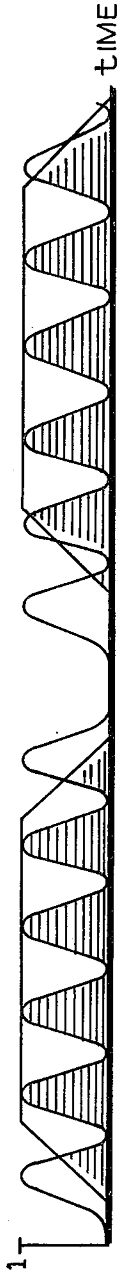

FIG. 6 demonstrates strobing by a lamp having a sinusoidal varying output,

FIG. 7 illustrates the elimination of the strobing shown in FIG. 5.

Figure 8A:
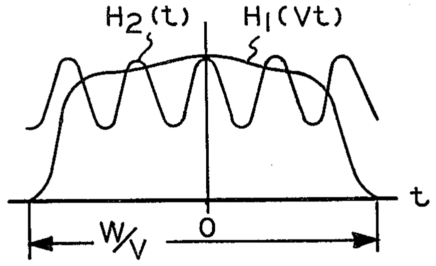
Figure 8B:
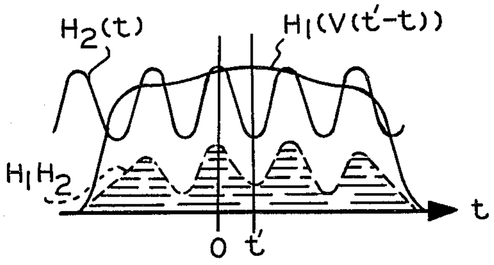
Figure 9A:
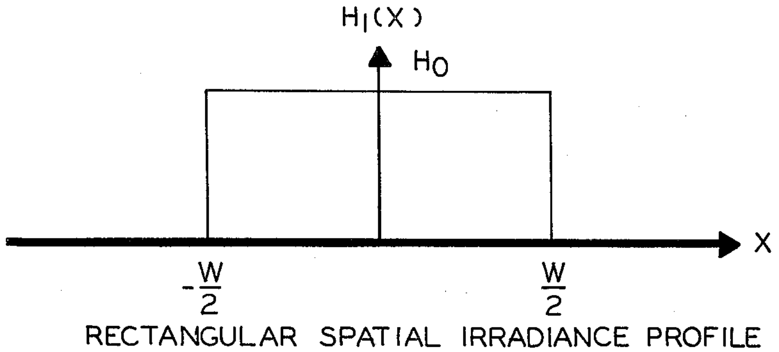
Figure 9B:
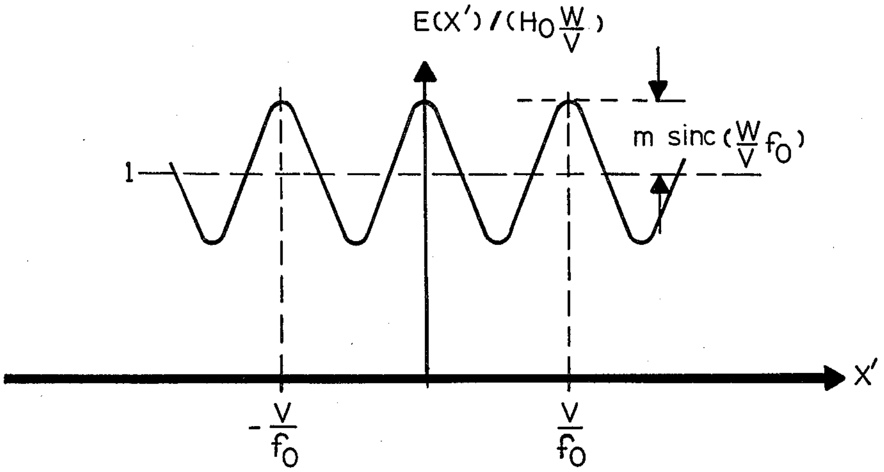
Figure 9C:
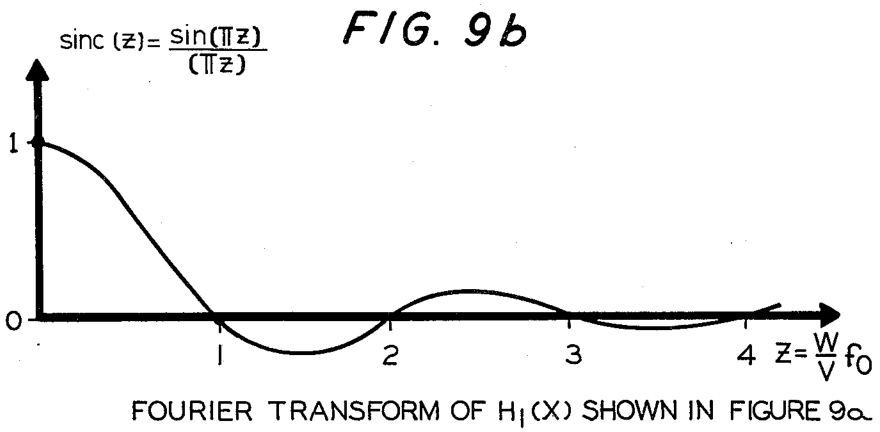

FIGS. 8*a* and 8*b* illustrate the space and time profiles across an aperture of an arbitrary irradiance function;

FIGS. 9*a* through 9*c* illustrate a rectangular irradiance profile, the resulting exposure distribution and the Fourier transform of the irradiance profile.

FIGS. 10*a* through 10*e* represent samples of irradiance functions across an aperture and the corresponding Fourier transform.

Figure 2:
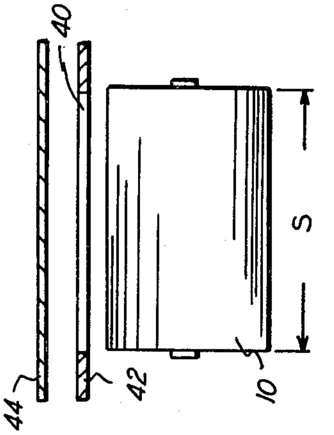
FIG. 2 is a partial front view of the photoreceptor drum, aperture plate, and transmission filter in accordance with the present invention.
Figure 1:
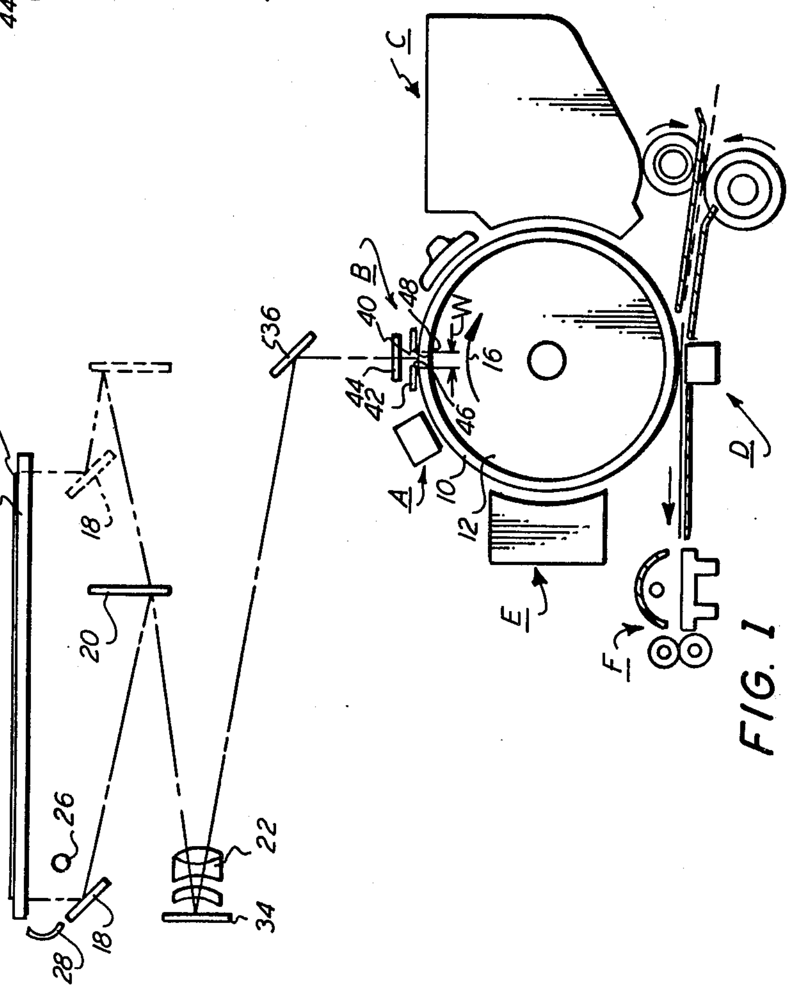
FIG. 1 is a schematic side elevation of an electrophotographic system employing the present invention.

Referring now to the drawings, in FIGS. 1 and 2 there is shown a typical electrophotographic printing machine incorporating the teachings of the present invention. An electrostatic charge is placed uniformly over the photosensitive surface 10 of a moving photoconductive drum 12, preparatory to receiving the light image of an original 14 to be reproduced. The charged surface 10 is moved through exposure station B in the direction of rotation 16 and a flowing light image of the original 14 is recorded on the surface 10. Next, the image bearing surface 10 is transported through a development station C for application of toner material to the charged surface 10 rendering the latent electrostatic image visible. The developed image is brought into contact with a sheet of final support material within a transfer station D and the toner image is electrostatically attracted from the surface 10 to the contacting side of the support sheet. Any residual toner particles remaining on the surface 10 after the completion of the transfer operation are removed within a cleaning station E placing the surface in a condition to repeat the process. After the transfer operation, the image bearing support sheet is forwarded to a fusing station F via a suitable conveyor.

Scanning of the original 14 is accomplished by a scanning mirror 18, a compensating mirror 20 and a stationary objective lens generally shown at 22. The scanning mirror 18 is supported upon a carriage (not shown) and the carriage moves back and forth over a prescribed horizontal path of travel below the surface of platen 24. Mounted on the carriage is an aperture lamp 26 with reflector 28 to illuminate a longitudinally extending incremental area upon the platen 24 within the viewing domain of the scanning mirror 18. The carriage moves across the lower surface of the platen 24 at a constant rate and the mirror 18 scans successive illuminated incremental areas on the platen 24 beginning at the start of scan at the left of FIG. 1 and terminating at the opposite side of the platen at the right of FIG. 1 as shown in phantom. A second movable carriage (not shown) supports the compensating mirror 20. Compensating mirror 20 is positioned on the carriage to receive light rays from the scanning mirror 18 and redirects these light rays towards the objective lens 22.

A reflecting surface 34 is positioned at the lens 22 stop position to reverse the received light rays as they pass through the lens components. The image created by the lens 22 is then directed back along the optical axis and focused upon the drum 12 via mirror 36 through the aperture 40 defined by the elongated, stationary aperture plate 42.

In accordance with the present invention, an elongated, stationary transmission filter 44 preferably a plastic or glass filter with a specified transmission profile overlies the aperture 40 substantially perpendicular to the optical axis, adjacent to the exposed image path. The aperture plate 42 is disposed near the photoreceptor between the photosensitive surface 10 and the transmission filter 44 as best seen in FIGS. 1 and 2. In practice, the transmission filter 44 may be positioned above or below the aperture plate 42, or may define the aperture by its transmission profile.

Figure 3:
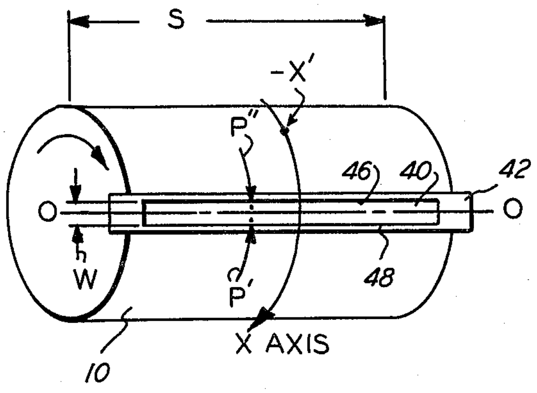
FIG. 3 is a schematic top view of the aperture plate and photoreceptor as viewed from the filter, FIG. 4 demonstrates strobing by an idealized lamp operation with respect to an arbitrary aperture.

As seen in FIGS. 1 and 3, the aperture plate 42 comprises a pair of oppositely disposed elongated edges 46, 48 defining aperture 40 having width W. The width, W, between edges 46, 48 may vary along the length of the aperture plate 42. Without the transmission filter 44, a first irradiance profile producing undesirable exposure variations is projected through the aperture 40 onto the photosensitive surface 10. Interposing the transmission filter 44 into the image path alters the first irradiance profile to eliminate strobing. The transmission filter 44 extends across the aperture width W. The elongated aperture and the elongated transmission filter extend along the width S of the photoconductive drum 12 in the incremental image path of the document 14.

Strobing phenomena can be described with reference to FIG. 3. As the photoconductive drum 12 rotates, points on the photosensitive surface 10 revolve about the center axis of the drum 12. For a short period of time during each revolution, the points traverse from one of the elongated edges 46 of the aperture plate 42 to the oppositely disposed elongated edge 48 of the aperture plate 42. Two arbitrary points P′ and P″ are shown in FIG. 3 by points traversing from edge 46 to edge 48 along an axis circumscribing the drum 12 surface and parallel to the illustrated x axis. Since the exposure lamp is not in a state of a constant level of intensity but in reality provides time varying irradiance at the frequency of the lamp electrical power supply, points on photosensitive surface 10 receive different total exposures. In other words, with reference to FIG. 3, as points P′ and P″ traverse the aperture width, W, from edge 46 to edge 48, one of the points may receive a greater exposure from the illuminating lamp than the other point.

Figure 4:
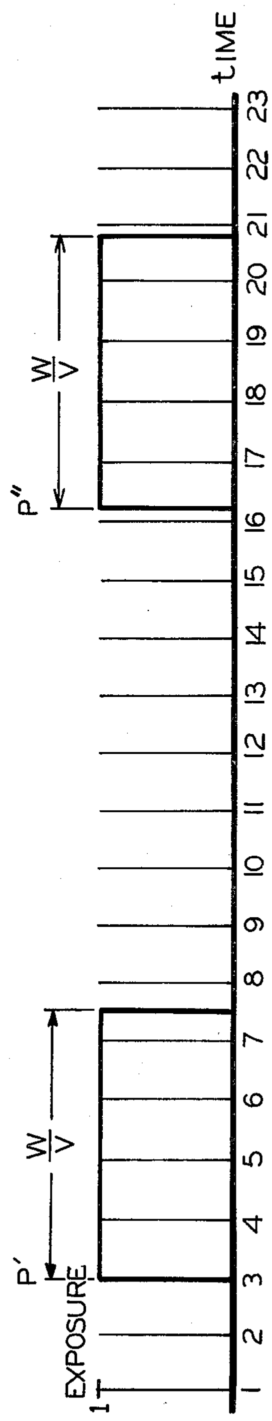

For example, FIG. 4 represents an idealized lamp operation providing discrete pulse of light at a given rate and providing no light in between pulses. Since the lamp output is a function of time, the abscissa represents time. However, for a given photoconductive drum velocity v, in a given period of time t, a point on the drum will travel a distance $d=vt$. Therefore the aperture width W divided by the drum velocity v, can be represented in FIG. 4 as covering a given time period which is the exposure time for any point. The point P′, in the left hand graph of FIG. 4, is assumed to receive a pulse of light, pulse number 3, immediately upon entering the aperture W and receives four more pulses numbers 4, 5, 6 and 7, before passing beyond the opposite edge of the aperture plate. In the example, there is a total exposure of five pulses of light. Point P″ in the right hand graph, on the other hand, does not receive its first pulse of light number 17 until it has traveled a finite distance into the aperture. Point P″ receives just four pulses of light, numbers 17, 18, 19 and 20 before traversing the aperture. The exposure of a point is therefore seen to be dependent upon the time at which the point enters the exposure region.

Since adjacent points on the photoconductor enter the exposure region at different times, the exposure will vary from point-to-point on the photoconductor. Exposure modulation M can be defined as the ratio of the difference of the exposure of two points to the sum of the exposure of the points, i.e.

$$M = \frac{E(P') - E(P'')}{E(P') + E(P'')}$$

where E(P) is the total exposure of point P. In the above example, there is a modulation factor of:

$$M = \frac{5-4}{5+4} = \frac{1}{9} = 11\%.$$

Of course, M=0 if the points receive the same amount of exposure. It can also be seen in FIG. 4 that the total exposure time is approximately 4½ periods. Obviously, total exposure time is constant for all points since all points move the same distance W at the same speed v. Thus, the point P′ receives greater illumination than point P″ merely because of the fortuitous instant of time at which point P′ entered the aperture.

Point P″ lies on a longitudinal axis parallel to edges 46 and 48 on the photosensitive surface and all points on the axis will receive the same degree of exposure. Thus, there will be lines on the photosensitive surface receiving less exposure than other lines, such as lines corresponding to point P″. These lines of less exposure result in undesirable developed lines on the photosensitive surface that are transferred to the copy sheet. These lines (strobing) are eliminated if the modulation factor or difference of exposure of points (corresponding to lines) is reduced to zero as illustrated in FIG. 5. FIG. 5 demonstrates the tapering of the irradiance at the edges of the aperture plate and thus extending graphically the exposure time to 6½ periods having an additional exposure period at each edge of the aperture. Point P′ in FIG. 5 receives an additional one half exposure pulse at one end of the aperture, assuming a peak exposure of one, and point P″ receives effectively ¾ of an exposure pulse at each end of the aperture. Thus, the total exposure at each point is 5.5 or zero modulation. Thus, by changing the transmission profile near the edges of the aperture, compensation is provided to equalize the total exposure of points on the photosensitive surface traversing the aperture at different times.

It should be understood nevertheless that the maximum aperture width W is fixed by other design considerations and therefore the time of illumination of points cannot be arbitrarily increased. However, the same effect can be achieved with a transmission filter by providing an illumination profile that slopes from a relative constant illumination at the center of the aperture to zero illumination at the edges of the aperture. For example, with reference to FIG. 5, assuming an aperture width W′, the exposure of points P′ and P″ will be equal if the irradiance profile slopes linearly to zero irradiance at the edges of the aperture and the width of each sloping edge is an integer multiple of the lamp period.

The output of an illumination lamp is more characteristically a sinusoidal function and the strobing phenomenon is illustrated in FIGS. 6 and 7. As in the previous example, for a given photoreceptor speed v, and a given aperture width W″, there is a predetermined time $t=W''/v$ of illumination for a point on the photosensitive surface traversing the aperture. This total time t can be illustrated graphically as encompassing a given number of cycles of the illumination lamp and also represents the aperture width W″. Total exposure is determined by the sum of the areas of a curve obtained by multiplying the spatial profile and the sinusoidol dependence as illustrated by shaded area in FIG. 7.

It can be shown that for a given point P′ as shown in the left hand graph in FIG. 6, exposure or the sum of the areas is 1.91 and the exposure of point P″ is 1.75 or a modulation of 4.4%. With reference to FIG. 7, by tapering the irradiance (transmission) profile at the edges of the aperture as shown graphically, the sum of the areas within the aperture W″ are identical (2.25). Again, it should be understood that the FIGS. 6 and 7 illustrate extending the illumination profile beyond the edges of the aperture W″. In this example, however, it is found that the linear taper of the transmission profile near the edges of the aperture causes exposure modulation to be eliminated. The width of the constant transmission segment is unimportant for purposes of controlling exposure modulation; however, it does affect the total value of exposure.

In actual practice, therefore, it is desirable to provide a transmission filter that has suitable transmission characteristics across the width, W, of the aperture to eliminate strobing. Furthermore, there is not always a constant or uniform irradiance profile incident on the aperture and onto the photosensitive surface for many applications. In accordance with the present invention, therefore, there is provided a class of transmission filters with specificied transmission characteristics and a method to design transmission filters to eliminate strobing caused by a wide variety of irradiance profiles. These filters can be defined by a necessary or required transmission profile for a given irradiance profile across an aperture to eliminate strobing. In other words, for a given irradiance profile across an aperture causing strobing on the photosensitive surface, there is a transmission filter with a transmission profile to eliminate strobing. The characteristics of these filters will now be described.

It can be assumed that the irradiance falling on the exposure aperture and therefore on the photoreceptor surface is a function of the spatial position across the aperture as well as a periodic function of time due to the illuminating lamp. This function can be expressed by equation 1

$$H(X_pt)=H_1(X_p)H_2(t) \quad (1)$$

where $H_1$ the is spatial irradiance function incident on the photoreceptor and $H_2$ is a periodic function of time due to the illuminating lamp having a fundamental frequency $f_o$ illustrated in FIG. 8*a*. Now consider an arbitrary point P on the photoconductive drum having a location $X_p(t=0)=-x'$. That is, at the time equal to zero it is arbitrarily assumed that the point P is at a location −x′ on the photosensitive surface relative to the centerline 0—0 of aperture 40 as seen in FIG. 3. With time, the point P moves in the direction of rotation of the photoconductive drum at velocity v such that $$X_p(t)=-x'+vt \quad (2)$$

defines the location along the X axis as shown in FIG. 3. Equation (2) defines the location of the point P at any time t. The total exposure E of the moving point P with t=0 location −x′ is:

$$E(x')=\int_{-\infty}^{\infty} H(X_p,t)\,dt=\int_{-\infty}^{\infty} H_1(-x'+vt)\,H_2(t)\,dt \quad (3)$$

or $$E(t')=\int_{-\infty}^{\infty} H_1[v(t-t')]H_2(t)\,dt \quad (4)$$

where $t'=x'/v$ is the time for point P to move from −x′ to the center of the aperture 0—0. Since each position at location x on the photosensitive surface measured relative to the aperture W centerline 0—0 is a function of the speed of the drum and the time of movement, the spatial function $H_1$ can be expressed as a time function. The graphic relationship of the space and time functions with respect to aperture W is illustrated in FIG. 8*a* with the abscissa representing time. The irradiance received by a point on the photosensitive surface is given as a function of time by the function $H_1.H_2$ shown in FIG. 8*b*. The exposure of that point is the (shaded) areas under the $H_1.H_2$ curve in FIG. 8*b*. This exposure (shaded area) will vary from point to point on the photosensitive surface due to the changing relative phase of $H_1$ with respect to $H_2$ for successive points such as point P′, P″ in FIG. 3. FIGS. 8*a* and 8*b* emphasize the difference in phase shift between $H_1(vt)$ and $H_2(t)$ for successive points with different t′ values. Parameter t′ in Equation 4 controls this relative phase.

The condition for zero strobing is that there be equivalent exposure for every point P traversing the aperture. That is, the exposure E must be constant for all points P on the photosensitive surface. Taking the Fourier transform of equation 4 results in the following expression (for symmetric $H_1$):

$$\tilde{E}(t')=\tilde{H}_1(X_p)\tilde{H}_2(t) \quad (5)$$

That is, the Fourier transform (~symbol) of the exposure function is merely the product of the transform of the spatial irradiance function $H_1$ and the transform of the time varying irradiance function $H_2$. Assuming a sinusoidal irradiance function $$H_2(t)=1+m\cos(2\pi f_o t) \qquad (6)$$

where m is the lamp modulation factor and $f_o$ is the fundamental lamp frequency, and substituting equation 6 into equation 5 we get $$\tilde{E}=\tilde{H}_1\left[\delta(f)+\frac{m}{2}\delta(f-f_o)+\frac{m}{2}\delta(f+f_o)\right] \qquad (7)$$

where δ(f) is the well known Dirac delta function. Taking the inverse transform of equation 7 where $x'=vt'$, we get:

$$E(x')=\left[\frac{1}{v}\widetilde{H_1(0)}\right]+\left[\frac{m}{v}\widetilde{H_1\left(\frac{f_o}{v}\right)}\right]\cos\left(\frac{2\pi f_o}{v}x'\right) \qquad (8)$$

$$\text{Since } E_{max}=\frac{1}{v}\widetilde{H_1(0)}+\frac{m}{v}\widetilde{H_1\left(\frac{f_o}{v}\right)}$$

and $$E_{min}=\frac{1}{v}\widetilde{H_1(0)}+\frac{m}{v}\widetilde{H_1\left(\frac{f_o}{v}\right)}$$

and $$M=\frac{E_{max}-E_{min}}{E_{max}+E_{min}}\text{, then} \qquad (9)$$

$$M=\frac{\widetilde{H_1\left(\frac{f_o}{v}\right)}}{\widetilde{H_1(0)}} \qquad (10)$$

That is, there is no strobing if E(x') is constant for all x' and this occurs if M=0. But M=0 if $$\tilde{H}_1\left(\frac{f_o}{v}\right)=0. \qquad (11)$$

Stated in another way, with reference to equation (11), for constant exposure, the Fourier transform of the spatial function $H_1(x)$ must be 0 when evaluated at spatial frequency $f_o/v$. That is, there is zero modulation or no strobing if the transform of the spatial function $H_1$ is 0 at the spatial frequency $f_o/v$.

This can be achieved by the introduction of a transmission filter in the region near the aperture plate and by proper selection of filter transmission characteristics. The application of this principal is shown by the following example.

FIG. 9*a* shows a rectangular spatial irradiance function. That is, let $H_1(x)$ be defined by a rectangular profile. The resulting exposure distribution is shown in FIG. 9*b*. The modulation of the exposure, which is the Fourier transform of the spatial function $H_1(x)$ is the function sinc $(Wf_o/v)$, and the graph of the well known sinc function for an arbitrary variable Z is shown in FIG. 9*c*. As seen, the sinc function is zero whenever the variable Z is an integer. Thus, for the transform of the rectangular profile function to be zero, it is only necessary that $(Wf_o/v)$ equals an integer. If filter irradiance is uniform, a filter transmission characteristic to satisfy this requirement could be realized by a rectangular function whose transmission is constant over a width of $W=v/f_o$ or W equals any integer multiple of $v/f_o$ but with a total width not exceeding the maximum value needed for the optical system to produce the desired image quality. If the irradiance on the filter is not uniform, then the filter transmission profile must compensate for the non-uniformity to produce a uniform irradiance profile such as shown in FIG. 9*a*. Then the selection of rectangular profile width $W=v/f_o$ or any integer multiple of $v/f_o$ will eliminate strobing.

The above example illustrates an application of the discovered property for strobing elimination to a very simple irradiance profile. As discussed previously, a constant irradiance over a constant width slit is frequently an undesirable solution, since the width of the profile is often required to vary along the long dimension of the exposure slit to provide center-to-edge exposure control. Furthermore, efficient illumination systems will frequently not produce this desired constant irradiance over the full width required for strobing control. A significant value of the present invention is that an entire class of filter transmission functions may now be produced to reduce or completely eliminate strobing. Within this broad, but well-defined class, one may generally find a filter function which simultaneously reduces strobing to an acceptable level, produces the desired center-to-edge exposure control, is compatible with variable magnification requirements and remains within the maximum width limits imposed by image quality constraints.

Other illustrations of this class of irradiance profiles produced by filters defined by this invention which reduce or eliminate strobing are shown in FIG. 10*b* through 10*e*. The left hand column shows the irradiance profiles on the photoreceptor produced by the filter and the right hand column shows the related Fourier transform. To reduce strobing with this class of filters, the width parameter W (or $W_1$ and $W_2$) is modified relative to the lamp frequency $f_o$ and photosensitive surface velocity v to cause the shown Fourier transform to have a low or zero value. With the appropriate width parameter, the $H_1(x)$ function then describes the irradiance profile determined by the transmission filter required to reduce or eliminate strobing.

If the lamp also has power at harmonics of its fundamental frequency $f_o$, then the transform of $H_1(x)$ must be zero (or have a very low value) at all those harmonics to eliminate (or significantly reduce) strobing. The examples of FIG. 10 all have this property of possessing periodic (or nearly periodic) zeroes in transform space. General mathematical methods for computing Fourier transforms of transmission functions and thus recognizing other members of this novel class of irradiance profile and transmission filters are described in various mathematical texts (Bracewell, R., *The Fourier Transform and Its Application,* McGraw Hill, New York, 1965). Application of these mathematical techniques may therefore be made to find other members of this class of irradiance profiles having zero (or near zero) Fourier transforms at the appropriate frequency, thus defining a filter transmission function for reduction of strobing.

It should be understood that if the irradiance distribution incident on the filter is not constant, but varies as $H_1'(x)$, then the filter transmission function T(x) for this non-uniform illumination condition should be adjusted to produce a photoreceptor irradiance function, $$H_1(x)=H_1'(x)\ T(x) \qquad (12)$$

of the form required to eliminate strobing. Thus if the incident illumination, $H_1'(x)$ is not constant, but is some known function, the correct filter transmission function T(x) may be found to produce a correct $H_1(x)$ final irradiance distribution on the photoreceptor using Equation (12) which meets all the previously described conditions for reduction on elimination of strobing.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. A machine having a document supported for illumination, a light source illuminating the document, with an irradiance defined as a function of time, $H_2(t)$ and having a fundamental frequency $f_o$ an optical path, the irradiance projected along the optical path a photoreceptor moving at a predetermined speed v;

an aperture plate defining an aperture disposed near the photoreceptor, the irradiance profile at the photoreceptor being defined by the function $H=H_1(x)H_2(t)$ where $H_1(x)$ is the spatial irradiance profile across the photoreceptor, and a transmission filter disposed near the aperture plate along the optical path wherein the transmission filter has transmission characteristics such that the Fourier transform of the function $H_1(x)$ evaluated at the lamp frequency $f_o$ equals zero.

2. The transmission filter of claim 1 wherein the Fourier transform of the function $H_1(x)$ is a sinc function.

3. A machine having a photoreceptor moving at a predetermined speed v;

an object;

the machine operating on the object to produce an irradiance profile on the photoreceptor, the irradiance profile being defined by the function $H_1(x)H_2(t)$ where $H_2(t)$ is a function of time having a fundamental frequency $f_o$ and $H_1(x)$ is the spatial function across the photoreceptor, and a transmission filter disposed between the object and the photoreceptor, the filter having transmission characteristics such that the Fourier transform of the function $H_1(x)$ is approximately zero when evaluated at the frequency $f_o$.

4. The machine of claim 3 wherein the object is a document illuminated by a light source having time dependent irradiance $H_2(t)$.

5. The machine of claim 3 wherein the object is a self-luminous object.

6. The machine of claim 5 where the object is a CRT tube.

7. The machine of claim 3 wherein the transmission filter includes the light limiting characteristic of an aperture plate and a characteristic to limit power to the strobing modulation.

8. The machine of claim 3 including an aperture plate disposed near the transmission filter for providing a light limiting characteristic.

9. The machine of claim 3 wherein the Fourier transform of the function $H_1(x)$ is a sinc function.

10. A method of providing a transmission filter for the elimination of strobing in a reproduction machine having a photoreceptor and comprising the steps of:

(1) determining the frequency of the illumination source;

(2) determining the speed of the photoreceptor;

(3) establishing an irradiance function $H_1(x)$ for the irradiance of any point on the photoreceptor; and (4) selecting a transmission filter with transmission characteristics producing an irradiance spatial function such that the Fourier transform of the irradiance function is zero at the (spatial) frequency of the given illumination source and wherein the illumination source spatial frequency is defined by the ratio of the illumination source frequency to the speed of the photoreceptor.

11. The method of claim 10 including the step of illuminating a document with a lamp having a fundamental frequency $f_o$ and the Fourier transform of $H_1(x)$ is zero at the spatial frequency $f_o/v$.

12. The method of claim 10 including the step of disposing an aperture plate defining an aperture near the photoreceptor, the aperture plate limiting the effects of the illumination source on the photoreceptor.

* * * * *